(12) United States Patent
Wu et al.

(10) Patent No.: US 8,094,260 B2
(45) Date of Patent: Jan. 10, 2012

(54) BACK LIGHT MODULE AND LIQUID CRYSTAL DISPLAY

(75) Inventors: Yi-Chun Wu, Hualien County (TW); Chien-Chung Lee, Tainan County (TW); Chun-Chi Chi, Taichung County (TW); Chung-Hui Hu, Yunlin County (TW); Yu-Chen Liu, Taipei (TW); Tzung-Fu Lai, Taichung County (TW); Ya-Ling Hsu, Changhua County (TW); Zi-Chi Ye, Taichung (TW); Chong-Yang Fang, Tainan County (TW); Ping-Yeng Chen, Taichung County (TW); Kuo-Chang Su, Tainan County (TW); Yu-Chen Ting, Changhua County (TW)

(73) Assignee: Wintek Corporation, Taichung (TW)

(*) Notice: Subject to any disclaimer, the term of this patent is extended or adjusted under 35 U.S.C. 154(b) by 249 days.

(21) Appl. No.: 12/337,575

(22) Filed: Dec. 17, 2008

(65) Prior Publication Data

US 2009/0153774 A1    Jun. 18, 2009

(30) Foreign Application Priority Data

Dec. 18, 2007   (TW) ................................ 96221548 U

(51) Int. Cl.
*G02F 1/1335* (2006.01)
(52) U.S. Cl. ................................ 349/64; 349/63; 349/65
(58) Field of Classification Search ........................ None
See application file for complete search history.

(56) References Cited

U.S. PATENT DOCUMENTS

| | | | | |
|---|---|---|---|---|
| 5,418,631 | A * | 5/1995 | Tedesco | 359/15 |
| 5,587,816 | A * | 12/1996 | Gunjima et al. | 349/62 |
| 6,246,506 | B1 * | 6/2001 | Kobayashi et al. | 359/246 |
| 6,339,501 | B1 * | 1/2002 | Kameyama et al. | 359/485 |
| 6,807,005 | B2 | 10/2004 | Honda et al. | |
| 6,974,221 | B2 | 12/2005 | Wu et al. | |
| 7,038,746 | B2 | 5/2006 | Tominaga et al. | |
| 2004/0218390 | A1 * | 11/2004 | Holman et al. | 362/245 |

* cited by examiner

*Primary Examiner* — Lucy Chien
(74) *Attorney, Agent, or Firm* — Jianq Chyun IP Office

(57) ABSTRACT

A liquid crystal display (LCD) including an LCD panel and a back light module is provided. The back light module is disposed below the LCD panel. The back light module includes a planar light source, a reflective polarized light enhancement film, a first prism film and a λ/4 phase retardation film. The planar light source is disposed below the LCD panel, while the reflective polarized light enhancement film is disposed between the LCD panel and the planar light source. The first prism film is disposed between the reflective polarized light enhancement film and the planar light source. Besides, the λ/4 phase retardation film is disposed between the reflective polarized light enhancement film and the first prism film. The back light module has a relatively high light utilization rate, and the LCD has favorable display luminance.

20 Claims, 4 Drawing Sheets

BACK LIGHT MODULE AND LIQUID CRYSTAL DISPLAY

CROSS-REFERENCE TO RELATED APPLICATION

This application claims the priority benefit of Taiwan application serial no. 96221548, filed on Dec. 18, 2007. The entirety of the above-mentioned patent application is hereby incorporated by reference herein and made a part of specification.

BACKGROUND OF THE INVENTION

1. Field of Invention

The present invention relates to a back light module and a liquid crystal display (LCD).

2. Description of Related Art

FIG. 1 is a schematic view illustrating a conventional side type back light module. Referring to FIG. 1, a side type back light module 100 includes a reflector 110, a light emitting unit 120, a light guide 130, and an optical film set 140. Here, the light guide 130 has a light incident plane 114 and a light emitting plane 116, while the light emitting unit 120 is disposed next to the light incident plane 114 of the light guide 130. In addition, the optical film set 140 is disposed on the light emitting plane 116 of the light guide 130. Light emitted from the light emitting unit 120 directly enters the light guide 130 or enters the light guide 130 after the light is reflected by the reflector 110. After that, the light is irradiated from the light emitting plane 116 of the light guide 130. The light guide 130 converts the light emitted from the light emitting unit 120 from a linear light source or a point light source to a planar light source. On the other hand, the light emitting unit 120 can be formed by a cold cathode fluorescent lamp (CCFL) or a plurality of light emitting diodes (LEDs).

The light of the light emitting unit 120 is scattered and discharged out of the light emitting plane 116. Due to various polarizations, a portion of the light emitted from the light emitting unit 120 cannot be directly utilized by the LCD panel. Hence, the optical film set 140 is often required by the back light module 100 for improving light emission characteristics. In detail, the optical film set 140 includes a diffuser film 142, a prism film 144, another prism film 146, and a reflective polarized light enhancement film 148. The diffuser film 142 enables the light to be uniformly distributed, while the prism films 144 and 146 concentrate radiation directions of the emitted light. Additionally, the reflective polarized light enhancement film 148 ensures the light to be emitted out of the back light module 100 in a certain polarization direction, and the light which is not able to be irradiated is reflected back to the back light module 100. The light which is reflected back to the back light module 100 would pass through the light guide 130 and some optical films including the diffuser film 142 and the prism films 144 and 146 after reflected again by the reflector 110. Here, a portion of the light is again transformed to be in the aforesaid polarization direction and emitted out of the back light module 100. The light undergoes the recycling process by using the reflective polarized light enhancement film 148, such that the light can be reused over and over again, and thereby the luminance of the emitted light is increased. Nevertheless, the light would be lost after traveling through the optical films back and forth for a couple of times. As such, the utilization of said light in the conventional back light module 100 is not optimized.

SUMMARY OF THE INVENTION

The present invention provides a back light module suitable for providing a light source required by an LCD panel. The back light module includes a planar light source, a reflective polarized light enhancement film, an optical film and a λ/4 phase retardation film. The planar light source is disposed below the LCD panel, while the reflective polarized light enhancement film is disposed between the LCD panel and the planar light source. The optical film is disposed between the reflective polarized light enhancement film and the planar light source. Besides, the λ/4 phase retardation film is disposed between the reflective polarized light enhancement film and the optical film.

The present invention further provides an LCD including an LCD panel and a back light module. The back light module is disposed below the LCD panel and includes a planar light source, a reflective polarized light enhancement film, an optical film and a λ/4 phase retardation film. The planar light source is disposed below the LCD panel, while the reflective polarized light enhancement film is sandwiched between the LCD panel and the planar light source. The optical film is disposed between the reflective polarized light enhancement film and the planar light source. Besides, the λ/4 phase retardation film is disposed between the reflective polarized light enhancement film and the optical film.

In the present invention, the λ/4 phase retardation film is disposed between the reflective polarized light enhancement film and the optical film, and thus the light reflected back to the back light module by the reflective polarized light enhancement film is transformed to a circular polarized light. The reflected light is then converted to a polarized light capable of passing through the reflective polarized light enhancement film after traveling through the λ/4 phase retardation film again. That is to say, by virtue of the disposition of the λ/4 phase retardation film, the light reflected back to the back light module by the reflective polarized light enhancement film can be mostly recycled and reused only by one conversion, thereby reducing the number of the passage of the light through the optical film. As such, a light utilization rate of the back light module can be improved, and the luminance of the back light module can also be enhanced. Namely, the LCD proposed in the present invention is equipped with relatively satisfactory display luminance.

In order to the make the aforementioned and other objects, features and advantages of the present invention comprehensible, several embodiments accompanied with figures are described in detail below.

DESCRIPTION OF EMBODIMENTS

Figure 1:
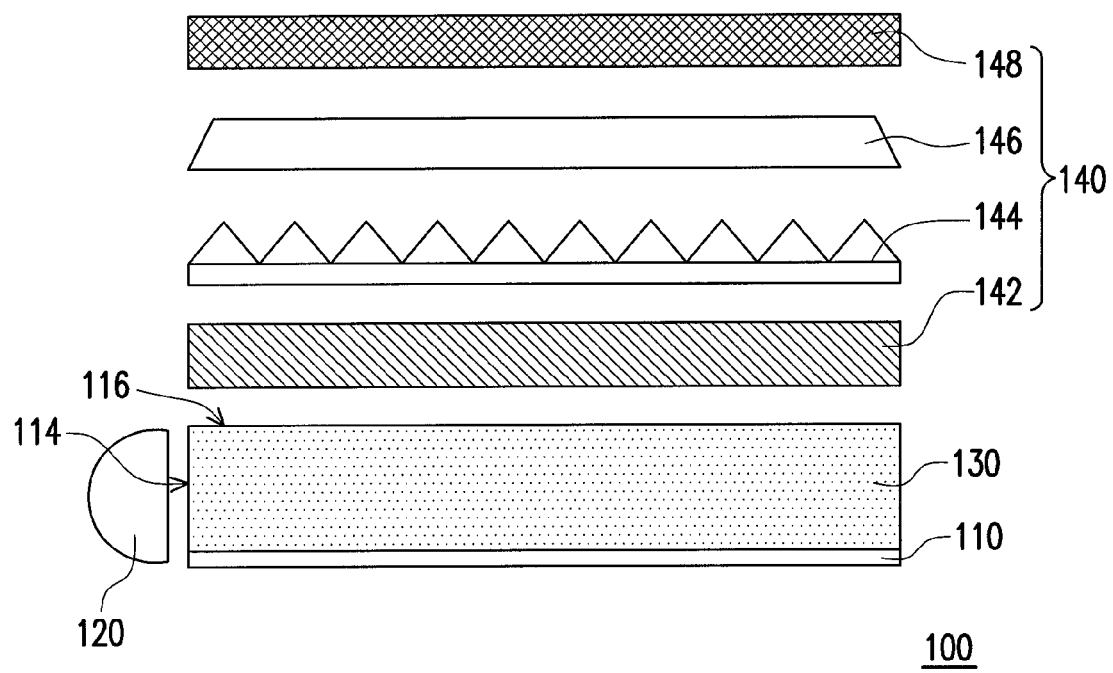
FIG. 1 is a schematic view illustrating a conventional side type back light module.
Figure 2:
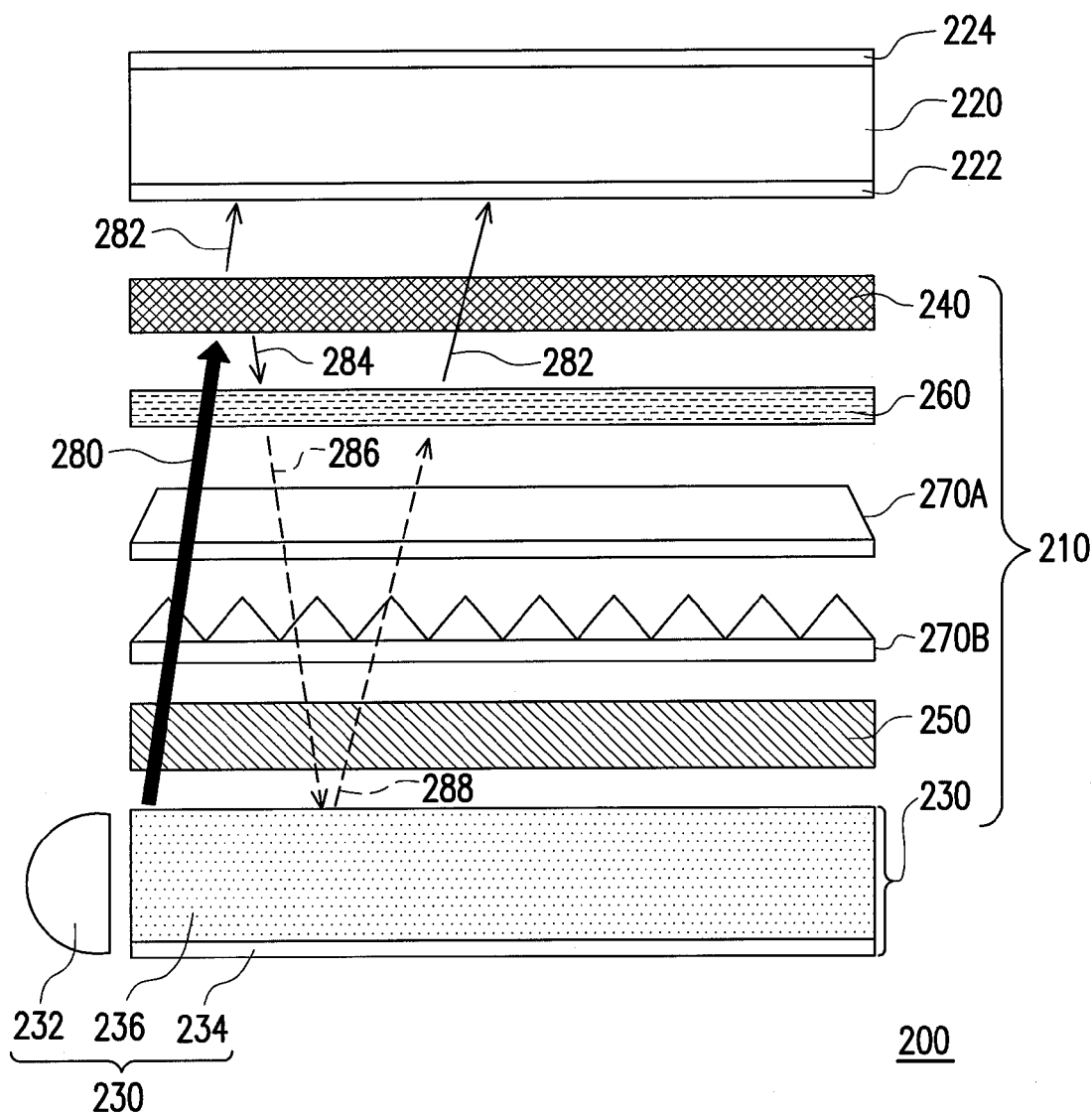
FIG. 2 is a schematic view of an LCD according to a first embodiment of the present invention.

FIG. 2 is a schematic view of an LCD according to a first embodiment of the present invention. Referring to FIG. 2, in an LCD 200, a back light module 210 provides a light source required by an LCD panel 220. The back light module 210 includes a planar light source 230, a reflective polarized light enhancement film 240, an optical film 250 and a λ/4 phase retardation film 260. In the present embodiment, the optical film 250 is, for example, a diffuser film uniformly distributing incident light beams. The planar light source 230 is disposed below the LCD panel 220, while the reflective polarized light enhancement film 240 is disposed between the LCD panel 220 and the planar light source 230. The optical film 250 is disposed between the reflective polarized light enhancement film 240 and the planar light source 230. Besides, the λ/4 phase retardation film 260 is disposed between the reflective polarized light enhancement film 240 and the optical film 250.

The back light module 210 includes a first prism film 270A and a second prism film 270B. In particular, the first prism film 270A and the second prism film 270B are disposed between the optical film 250 and the reflective polarized light enhancement film 240, and the extending direction of the prisms of the first prism film 270A and the extending direction of the prisms of the second prism film 270B are approximately perpendicular to each other. In the present embodiment, the λ/4 phase retardation film 260 is disposed above the first prism film 270A and the second prism film 270B. Practically, the λ/4 phase retardation film 260, the first prism film 270A, and the second prism film 270B are not required to be stacked in sequence. In other words, the λ/4 phase retardation film 260 can be disposed between the first prism film 270A and the second prism film 270B. Alternatively, the λ/4 phase retardation film 260 can also be disposed below the first prism film 270A and the second prism film 270B. Additionally, the arrangement of the first prism film 270A and the second prism film 270B can also be exchanged. Preferably, the λ/4 phase retardation film 260 is disposed below and closely adjacent to the reflective polarized light enhancement film 240, such that the reflected light can be converted and utilized in a more effective manner.

Specifically, the planar light source 230 includes at least a light emitting unit 232. In practice, the light emitting unit 232 includes at least a CCFL or a plurality of linearly-arranged LEDs. Besides, the planar light source 230 of the present embodiment is, for example, a side type back light unit, and the planar light source 230 further includes a reflector 234 and a light guide 236. The light emitting unit 232 is disposed at a side of the light guide 236, while the reflector 234 is disposed below the light guide 236. In another embodiment, the planar light source 230 may also be a direct type back light unit and may further include a light box in which a plurality of the CCFLs or the LEDs are disposed.

A light 280 emitted by the light emitting unit 232 is a non-polarized light. The light 280 directly enters the light guide 236. In an alternative, the light 280 enters the light guide 236 after the light 280 is reflected by the reflector 234 and travels through the optical film 250, the first prism film 270A, the second prism film 270B, the λ/4 phase retardation film 260, and the reflective polarized light enhancement film 240. After passing through the reflective polarized light enhancement film 240, the light 280 is divided into a first linear polarized light 282 and a second linear polarized light 284 in different polarization directions. The first linear polarized light 282 is able to penetrate the reflective polarized light enhancement film 240, whereas the second linear polarized light 284 is reflected back to the back light module 210.

As illustrated in FIG. 2, in the present embodiment, the reflected second linear polarized light 284 is converted into a first circular polarized light 286 after passing through the λ/4 phase retardation film 260. Here, the first circular polarized light 286 is, for example, a right-handed circular polarized light. Given that the first circular polarized light 286 is reflected by the reflector 234, the first circular polarized light 286 is transformed into a second circular polarized light 288 which is a left-handed circular polarized light, for example. When the second circular polarized light 288 travels through the λ/4 phase retardation film 260, the second circular polarized light 288 is then converted into the first linear polarized light 282 in a first polarization direction, so as to pass through the reflective polarized light enhancement film 240. In general, the light emitted by the light emitting unit 232 can be utilized in a more effective manner. Hence, the display luminance of the LCD 200 can also be significantly enhanced. That is to say, the λ/4 phase retardation film 260 disposed below the reflective polarized light enhancement film 240 is conducive to converting the light reflected by the reflective polarized light enhancement film 240 into a usable light. The light emitted by the light emitting unit 232 has a plurality of wavelengths, and it is not likely for the λ/4 phase retardation film 260 to generate λ/4 phase retardation at each of the wavelengths. Hence, a λ/2 phase retardation film (not shown) can also be disposed between the planar light source 230 and the reflective polarized light enhancement film 240 in the back light module 210, which results in a wide band effect that expands a wavelength range of the transmissible light. Thereby, more light beams at different wavelengths are able to pass through the back light module 210, so as to further enhance the light emission efficacy of the back light module 210.

A bottom polarizing film 222 and an upper polarizing film 224 are frequently disposed outside the LCD panel 220 for performing the display function. The bottom polarizing film 222 and the upper polarizing film 224 allow the passage of the individual linear polarized light beams whose polarization directions are perpendicular to each other. In the LCD 200, the bottom polarizing film 222 should be designed for permitting the passage of the first linear polarized light 282. Namely, the bottom polarizing film 222 and the reflective polarized light enhancement film 240 are required to allow the passage of the light beams with the same polarization characteristics. Specifically, the polarization characteristics of the light passing through the reflective polarized light enhancement film 240 should be the same as the polarization characteristics of the light passing through the bottom polarizing film 222.

In the aforesaid first embodiment, the LCD 200 can also have another derivative structure (not shown). For instance, the first prism film 270A can be omitted, while a prism structure (e.g. a complex brightness enhancement-reflective polarizer BEF-RP manufactured by 3M) is additionally disposed on an upper surface of the reflective polarized light enhancement film 240. Here, the upper surface of the reflective polarized light enhancement film 240 faces the bottom polarizing film 222. The prism structure of the reflective polarized light enhancement film 240 is substantially perpendicular to the second prism film 270B, while other components of the prism structure are identical to those provided in the first embodiment. No further description is provided herein accordingly.

Figure 3:
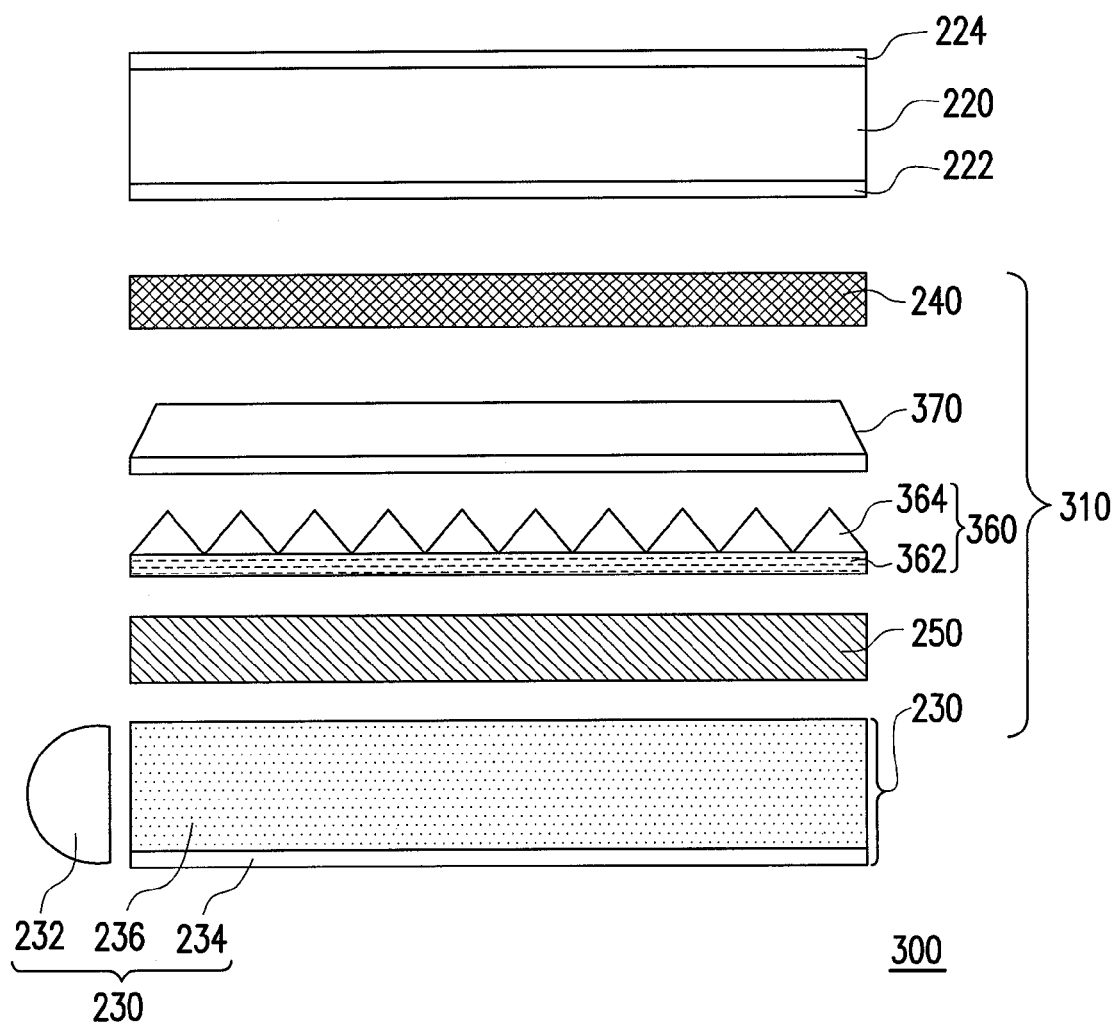
FIG. 3 is a schematic view of an LCD according to a second embodiment of the present invention.

In the LCD of the present invention, the structure and the design of the back light module are not restricted to those provided in the first embodiment. FIG. 3 is a schematic view of an LCD according to a second embodiment of the present invention. Referring to FIG. 3, an LCD 300 is approximately identical to the LCD 200. The difference therebetween lies in that a λ/4 phase retardation film 360 disclosed in the present embodiment includes a basement 362 and a prism structure 364 disposed on the basement 362 equipped with optical characteristics allowing the λ/4 phase retardation.

In particular, the basement 362 is made of polymers such as polyethylene terephthalate (PET) or the like, for example. During the formation of the basement 362 made of the polymers, the basement 362 can be equipped with certain optical characteristics based on adjusting the manufacturing process.

As such, the basement 362 is able to generate the λ/4 phase retardation. Moreover, the disposition of the prism structure 364 on the basement 362 allows the λ/4 phase retardation film 360 to function as a prism and to provide the phase retardation.

Furthermore, only one prism film 370 is needed in the back light module 310. The prism film 370 is, for example, arranged in parallel to the λ/4 phase retardation film 360 and is disposed between the optical film 250 and the reflective polarized light enhancement film 240. According to the present embodiment, the prism film 370 is located between the λ/4 phase retardation film 360 and a reflective polarized light enhancement film 240. In detail, the prisms of the prism film 370 and the prism structure of the λ/4 phase retardation film 360 are substantially perpendicular to each other, so as to gather radiation of the polarized light beams at different angles and to improve the light emission efficacy of the back light module 310. The light emitted by the light emitting unit 232 has a wavelength mixed by a plurality of wavelengths, and it is not likely for the λ/4 phase retardation film 360 to generate the λ/4 phase retardation at each of the wavelengths. Hence, the prism film 370 is able to generate the λ/2 phase retardation for further increasing the light utilization rate of the back light module 310, for example. In other embodiments, the λ/4 phase retardation film 360 can be disposed below the adjacent reflective polarized light enhancement film 240. That is to say, the prism film 370 is positioned between the λ/4 phase retardation film 360 and the optical film 250, such that the light reflected by the reflective polarized light enhancement film 240 is mostly transformed into the circular polarized light. Thereby, the light utilization rate can be further improved.

The disposition of the λ/4 phase retardation film 360 below the reflective polarized light enhancement film 240 permits the light reflected by the reflective polarized light enhancement film 240 to be again converted to the usable light. As such, the brightness of the back light module 310 and the display luminance of the LCD 300 can both be increased. In addition, by combining the λ/4 phase retardation film 360 of the prism structure 364, the number of the optical films of the back light module 310 is reduced, thus giving rise to miniaturization of the back light module 310.

In the aforesaid second embodiment, the LCD 300 can also have another derivative structure (not shown). For instance, the first prism film 370 can be omitted. Besides, another prism structure is, for example, disposed on the upper surface of the reflective polarized light enhancement film 240. Here, the upper surface of the reflective polarized light enhancement film 240 faces the bottom polarizing film 222. The prism structure of the reflective polarized light enhancement film 240 is substantially perpendicular to the prism structure 364 of the λ/4 phase retardation film 360, while other components of the prism structure are identical to those provided in the second embodiment. No further description is provided herein accordingly.

Figure 4:
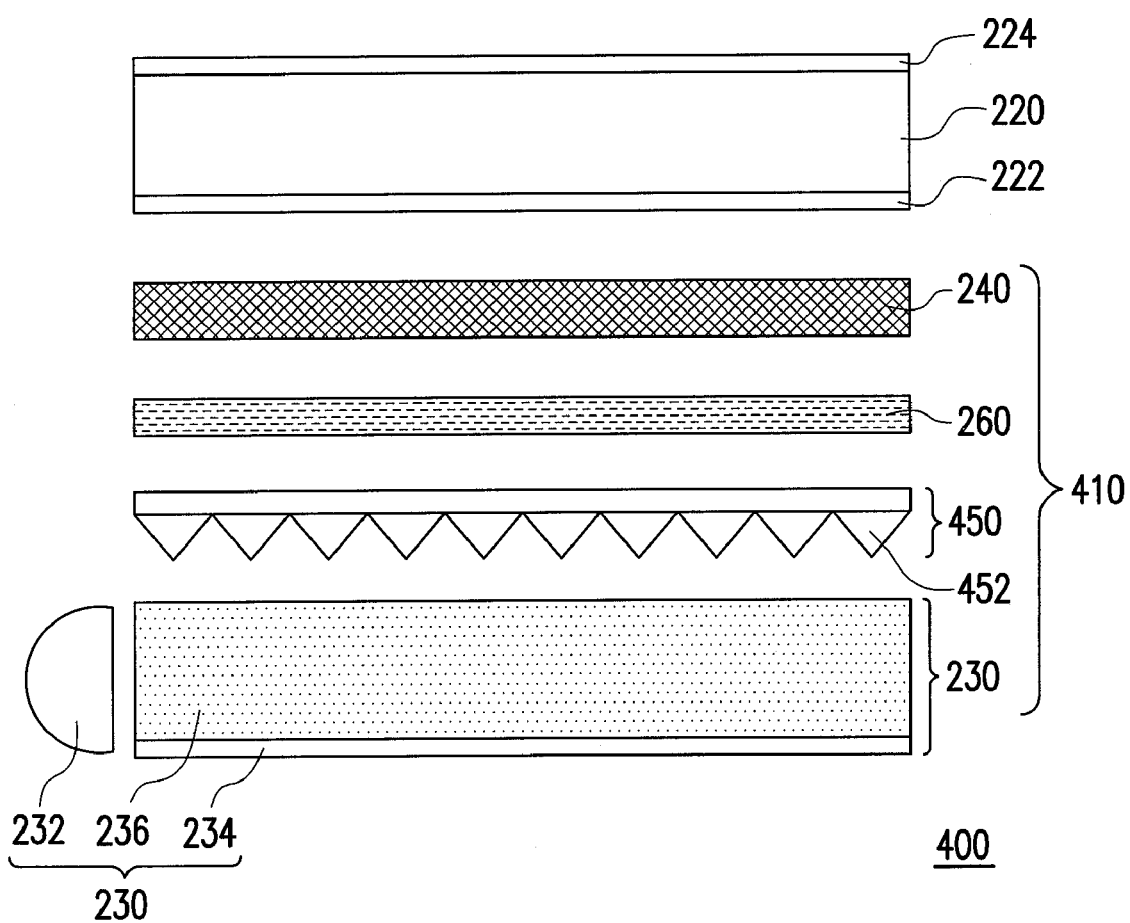
FIG. 4 is a schematic view of an LCD according to a third embodiment of the present invention.

FIG. 4 is a schematic view of an LCD according to a third embodiment of the present invention. Referring to FIG. 4, an LCD 400 is approximately identical to the LCD 200. The difference therebetween lies in that the optical film in a back light module 410 is a reverse prism film 450. In detail, the reverse prism film 450 includes a prism structure 452 extending along an axis and facing the planar light source. The axis is a straight line or an arc line (e.g. a concentric circular arc line in which the light emitting unit is taken as the center).

The λ/4 phase retardation film 260 is conducive to converting the light reflected by the reflective polarized light enhancement film 240 into the usable light, so as to improve the brightness of the back light module 410. According to the present embodiment, the reverse prism film 450 is able to refract the light into a positive viewing angle, and thus the brightness of the back light module 410 at the positive viewing angle can be further improved. Based on actual measurement, the reverse prism film 450 integrated into the back light module 410 contributes to an improvement of the luminance of the light emitting from the back light module 410 by 16%. In particular, it is not required to use multiple prism films in the back light module 410. Therefore, the volume of the back light module 410 can be reduced due to the simplified components of the back light module 410.

To sum up, in the back light module and the LCD proposed in the present invention, the disposition of the λ/4 phase retardation film contributes to the conversion of the light which is reflected by the reflective polarized light enhancement film back to the back light module into the circular polarized light. Accordingly, the light reflected by the reflective polarized light enhancement film can be used again. In other words, the back light module and the LCD proposed in the present invention bring about a relatively high light utilization rate, and the LCD of the present invention has desired display luminance.

Although the invention has been described with reference to a particular embodiment thereof, it will be apparent to one of the ordinary skills in the art that modifications to the described embodiment may be made without departing from the spirit of the invention. Accordingly, the scope of the invention will be defined by the attached claims not by the above detailed description.

What is claimed is:

1. A back light module adapted to provide a light source required by a liquid crystal display panel, the back light module comprising:
   a planar light source disposed below the liquid crystal display panel;
   a reflective polarized light enhancement film disposed between the planar light source and the liquid crystal display panel;
   a first prism film disposed between the reflective polarized light enhancement film and the planar light source; and
   a λ/4 phase retardation film disposed between the reflective polarized light enhancement film and the first prism film, wherein the λ/4 phase retardation film comprises a basement and a prism structure disposed on the basement, and the basement provides a λ/4 phase retardation.

2. The back light module as claimed in claim 1, wherein the first prism film has a prism structure extending along an axis, and the prism structure faces the planar light source.

3. The back light module as claimed in claim 2, wherein the axis is a straight line or an arc line.

4. The back light module as claimed in claim 1, further comprising a diffuser film disposed between the first prism film and the planar light source.

5. The back light module as claimed in claim 1, wherein the first prism film provides a λ/2 phase retardation.

6. The back light module as claimed in claim 1, further comprising a second prism film disposed between the first prism film and the reflective polarized light enhancement film, and the extending direction of prisms of the first prism film and the extending direction of prisms of the second prism film are perpendicular to each other.

7. The back light module as claimed in claim 1, wherein the planar light source comprises at least a light emitting unit.

8. The back light module as claimed in claim 7, wherein the light emitting unit comprises at least a cold cathode fluorescent lamp.

9. The back light module as claimed in claim 7, wherein the light emitting unit comprises a plurality of light emitting diodes.

10. A liquid crystal display, comprising:
   a liquid crystal display panel; and
   a back light module disposed below the liquid crystal display panel, the back light module comprising:
      a planar light source disposed below the liquid crystal display panel;
      a reflective polarized light enhancement film disposed between the planar light source and the liquid crystal display panel;
      an optical film disposed between the reflective polarized light enhancement film and the planar light source; and
      a λ/4 phase retardation film disposed between the reflective polarized light enhancement film and the optical film, wherein the λ/4 phase retardation film comprises a basement and a prism structure disposed on the basement, and the basement provides a λ/4 phase retardation.

11. The liquid crystal display as claimed in claim 10, wherein the optical film comprises a diffuser film.

12. The liquid crystal display as claimed in claim 10, further comprising a first prism film arranged in parallel to the λ/4 phase retardation film and disposed between the optical film and the reflective polarized light enhancement film.

13. The liquid crystal display as claimed in claim 12, wherein the first prism film provides a λ/2 phase retardation.

14. The liquid crystal display as claimed in claim 12, further comprising a second prism film, wherein the first prism film and the second prism film are disposed between the optical film and the reflective polarized light enhancement film, and the extending direction of prisms of the first prism film and the extending direction of prisms of the second prism film are perpendicular to each other.

15. The liquid crystal display as claimed in claim 10, wherein the optical film comprises a reverse prism film having a prism structure facing the planar light source.

16. The liquid crystal display as claimed in claim 15, wherein the prism structure extends along an axis.

17. The liquid crystal display as claimed in claim 16, wherein the axis is a straight line or an arc line.

18. The liquid crystal display as claimed in claim 10, wherein the planar light source comprises at least a light emitting unit.

19. The liquid crystal display as claimed in claim 18, wherein the light emitting unit comprises at least a cold cathode fluorescent lamp.

20. The liquid crystal display as claimed in claim 18, wherein the light emitting unit comprises a plurality of light emitting diodes.

* * * * *